United States Patent

Maekawa et al.

Patent Number: 5,847,061
Date of Patent: Dec. 8, 1998

[54] PROCESS FOR PRODUCING POLYMERS HAVING TERMINAL FUNCTIONAL GROUP WHICH MAY BE PROTECTED

[75] Inventors: Kazuhiko Maekawa; Toshiaki Sato, both of Kurashiki, Japan

[73] Assignee: Kuraray Co., Ltd., Kurashiki, Japan

[21] Appl. No.: 537,946

[22] PCT Filed: Mar. 20, 1995

[86] PCT No.: PCT/JP95/00499

§ 371 Date: Nov. 21, 1995

§ 102(e) Date: Nov. 21, 1995

[87] PCT Pub. No.: WO95/25753

PCT Pub. Date: Sep. 28, 1995

[30] Foreign Application Priority Data

Mar. 23, 1994 [JP] Japan .................................. 6-51779
Sep. 30, 1994 [JP] Japan ................................ 6-236620
Dec. 16, 1994 [JP] Japan ................................ 6-313038

[51] Int. Cl.$^6$ .................. C08F 4/40; C08F 2/00
[52] U.S. Cl. ................. 526/204; 526/214; 526/220; 526/222; 526/223
[58] Field of Search ............... 526/223, 222, 526/220, 214, 204

[56] References Cited

U.S. PATENT DOCUMENTS

| 2,396,997 | 3/1946 | Fryling . |
| 3,337,518 | 8/1967 | Serniuk ................................ 526/222 |
| 4,013,824 | 3/1977 | Uraneck et al. . |
| 4,027,090 | 5/1977 | Giddings ............................... 526/224 |
| 4,988,781 | 1/1991 | McKinney ............................. 526/68 |

FOREIGN PATENT DOCUMENTS

| 0 001 092 | 3/1979 | European Pat. Off. . |
| 0 124 782 | 11/1984 | European Pat. Off. . |
| 0 469 954 | 2/1992 | European Pat. Off. . |
| 58-108213 | 6/1983 | Japan . |
| WO92/13903 | 8/1992 | WIPO . |

Primary Examiner—Christopher Henderson
Attorney, Agent, or Firm—Oblon, Spivak, McClelland, Maier & Neustadt, P.C.

[57] ABSTRACT

A process for producing polymers having terminal functional group which may be protected, comprises polymerizing a radical-polymerizable monomer with a polymerization initiator comprising at least one member selected from the group (A) consisting of thio-S-carboxylic acids represented by the following general formula (1) and dithiocarboxylic acids represented by the following general formula (2) and at least one member selected from the group (B) consisting of polysulfides represented by the following general formula (3), polysulfides represented by the following general formula (4) and sulfoxides:.

$$R^1-\underset{\underset{O}{\|}}{C}-SH \qquad (1)$$

wherein $R^1$ represents a hydrocarbon group which may have a substituent including functional group;

$$R^2-\underset{\underset{S}{\|}}{C}-SH \qquad (2)$$

wherein $R^2$ represents a hydrocarbon group which may have a substituent including functional group;

$$R^3-\underset{\underset{O}{\|}}{C}-(S)_n-\underset{\underset{O}{\|}}{C}-R^4 \qquad (3)$$

wherein $R^3$ and $R^4$ each represents a hydrocarbon group which may have a substituent including functional group and n is an integer of 2 or more; and $$R^5-(S)_m-R^6 \qquad (4)$$

wherein $R^5$ and $R^6$ each represents a hydrocarbon group having a functional group and m is an integer of 2 or more. This process can produce polymers with which functional groups have been introduced into one end or both ends thereof; irrespective of the rate of polymerization or the degree of polymerization of the polymer that forms.

15 Claims, No Drawings

PROCESS FOR PRODUCING POLYMERS HAVING TERMINAL FUNCTIONAL GROUP WHICH MAY BE PROTECTED

TECHNICAL FIELD

The present invention relates to a process for producing polymers having on one end or both ends thereof a mercapto, amino, hydroxyl, carboxyl, isocyanate or like functional groups which may be protected.

BACKGROUND ART

There have been proposed several processes for producing, by radical polymerization, polymers having a terminal functional group such as mercapto, amino, hydroxyl, carboxyl or isocyanate group.

Known processes for producing polymers having a terminal mercapto group include the following.

① One which comprises photopolymerizing a radical-polymerizable monomer in the presence of a tetraalkylthiuram disulfide or dibenzoyl disulfide and then treating the obtained polymer having terminal thiocarbamate group or thiobenzoate group with an acid or alkali ("Makromolekular Chemie, Rapid Communications" 3, 127 (1982) or Journal of Japan Rubber Association 59, No. 12, 658 (1986), hereinafter this process is referred to as "Process A").

② One which comprises, utilizing ready addition of mercapto group to double bond such as olefin, permitting a thio-S-carboxylic acid to add to a polymer having terminal double bond and treating the obtained polymer having terminal thio-S-carbonate group with an acid or alkali ("Makromoleckular Chemie, Symposia" 48/49, 317 (1991), hereinafter referred to as "Process B").

③ One which comprises polymerizing a radical-polymerizable monomer in the presence of a thio-S-carboxylic acid and with an initiator of azobisisobutyronitrile (hereinafter abbreviated as AIBN) and treating the obtained polymer having terminal thio-S-carbonate group with an acid or alkali (Japanese Patent Application Laid-open No. 187005/1984, hereinafter referred to as "Process C").

Known processes for producing polymers having a terminal amino, isocyanate, hydroxyl or carboxyl group include the following.

④ One which comprises polymerizing a radical-polymerizable monomer in the presence of the hydrochloric acid salt of mercaptoethylamine, to obtain a polymer having amino group on one end thereof ("Journal Polymer Science Part A Polymer Chemistry" 27, 2007 (1989), hereinafter referred to as "Process D").

⑤ One which comprises polymerizing t-butyl acrylate in the presence of 4,4'-diaminodiphenyl disulfide and with an initiator of AIBN and hydrolyzing the resulting polymer, to obtain a polyacrylic acid having amino group on both ends thereof ("Macromolecules" 26, 2240 (1993), hereinafter referred to as "Process E").

⑥ One which comprises photopolymerizing a radical-polymerizable monomer in the presence of 4,4'-diaminodiphenyl disulfide or 4,4'-diisocyanatediphenyldisulfide, to obtain a polymer having amino group or isocyanate group on both ends thereof ("Kobunshi-kagaku" 26, No. 286, 148 (1969), hereinafter referred to as "Process F").

⑦ One which comprises polymerizing a radical-polymerizable monomer with an initiator of hydrogen peroxide, to obtain a polymer having hydroxyl group on one end or both ends thereof (Japanese Patent Application Laid-open No. 75912/1984, hereinafter referred to as "Process G").

⑧ One which comprises polymerizing a radical-polymerizable monomer in the presence of 4,4'-azobis-4-cyanovaleric acid and dithioglycolic acid, to obtain a polymer having hydroxyl group on both ends thereof ("Polymer Preprints, Japan" 36, No. 6, 1637 (1987), hereinafter referred to as "Process H").

Process A is not applicable to all radical-polymerizable monomers and cannot be applied to acrylonitrile, vinyl acetate, vinylidene chloride or the like. Besides, this process, which uses light-irradiation polymerization, has the problems of difficulty in controlling polymerization rate and heat removal and has hence not been used on a commercial scale. Process B requires previous preparation of a polymer having terminal double bond, which increases the number of reaction steps and thus raises the production cost. Process C can introduce mercapto group into only one end of the polymer and further has the problem that increasing the polymerization rate results in a lowered ratio of introduction of mercapto group into the end of the obtained polymer. For instance, when methyl methacrylate is polymerized, with the intended goal of degree of polymerization being 500, in the presence of thio-S-acetic acid and using an azo- or peroxide-based radical polymerization initiator, at a polymerization rate of 30%/h, the ratio of introduction of mercapto group into one end of the resulting polymer will only be about 50%. In order to obtain a polymer having a high degree of polymerization of at least 1,000 with which the ratio of introduction of mercapto group into one end is at least 90%, it is necessary to control the rate of polymerization at not more than 1%/h, thereby deteriorating the productivity on a commercial scale. Process D can introduce amino group into only one end of the obtained polymer. Besides, since the hydrochloric acid salt of mercaptoethylamine hardly dissolves in the radical-polymerizable monomer used, this process requires addition of a large amount of a good solvent to the polymerization zone, which decreases the ratio of introduction of amino group. With process E, which can introduce amino group into both ends of the resulting polymer though, the ratio of introduction of amino group decreases upon production of a polymer having high degree of polymerization. Process F, which uses light-irradiation polymerization, has the problems of difficulty in controlling polymerization rate and heat removal and has hence not been used on a commercial scale. Process G requires conducting emulsion polymerization in water or like polar solvents using an emulsifier, since hydrogen peroxide hardly dissolves in the radical-polymerizable monomer used. This makes complex the production process. Furthermore, with Process G it is difficult to control the degree of polymerization of the obtained polymer. Process H, which can introduce carboxyl group into only one end of the resulting polymer, has another problem of the production cost becoming high and has hence not been used on a commercial scale.

An object of the present invention is to provide a commercially advantageous process for producing polymers; the process being applicable to any radical-polymerizable monomer and capable of introducing mercapto, amino, hydroxyl, carboxyl, isocyanate or like functional groups, which may be protected, into one end or both ends of the obtained polymer, causing no decrease in the ratio of introduction of functional group even upon high-rate polymerization or production of a polymer having a high degree of polymerization of at least 500 and requiring only a few reaction steps.

DISCLOSURE OF THE INVENTION

The present invention provides a process for producing polymers having terminal functional group which may be protected, comprising polymerizing a radical-polymerizable monomer with a polymerization initiator comprising at least one member selected from the group (A) consisting of thio-S-carboxylic acids represented by the following general formula (1) and dithiocarboxylic acids represented by the following general formula (2) and at least one member selected from the group (B) consisting of polysulfides represented by the following general formula (3), polysulfides represented by the following general formula (4) and sulfoxides:

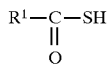 (1)

wherein $R_1$ represents a hydrocarbon group which may have a substituent including functional group;

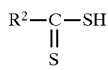 (2)

wherein $R^2$ represents a hydrocarbon group which may have a substituent including functional group;

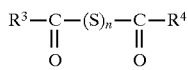 (3)

wherein $R^3$ and $R^4$ each represents a hydrocarbon group which may have a substituent including functional group and n is an integer of 2 or more; and

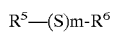 (4)

wherein $R^5$ and $R^6$ each represents a hydrocarbon group having a functional group and m is an integer of 2 or more.

BEST MODE FOR CARRYING OUT THE INVENTION

In the present invention, it is necessary to use a reducer (hereinafter sometimes referred to as component A of polymerization initiator) comprising at least one member selected from the group consisting of thio-S-carboxylic acids represented by the following general formula (1) and dithiocarboxylic acids represented by the following general formula (2)

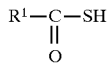 (1)

wherein $R^1$ represents a hydrocarbon group which may have a substituent including functional group, and

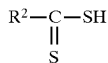 (2)

wherein $R^2$ represents a hydrocarbon group which may have a substituent including functional group.

In the general formula (1), preferred examples of the hydrocarbon group represented by $R^1$ are those having 1 to 10 carbon atoms, among which alkyl groups and aryl groups are particularly preferred. Examples of the alkyl groups are methyl, ethyl, propyl, isopropyl, n-butyl, t-butyl, pentyl, hexyl, octyl, nonyl and decyl. Examples of the aryl groups are phenyl and naphthyl. Among the above, lower alkyl groups having 1 to 4 carbon atoms and phenyl group are preferred. These hydrocarbon groups may have a substituent. Examples of the substituent are amino, hydroxyl, carboxyl, isocyanate, cyano, nitro, acyl, thioacyl, alkoxyl and halogen atoms. Among these substituents, amino, hydroxyl, carboxyl, isocyanate and like functional groups may be protected.

Examples of the thio-S-carboxylic acids represented by formula (1) are thio-S-acetic acid, thio-S-propionic acid, thio-S-butyric acid, thio-S-benzoic acid, aminothio-S-acetic acid, p-aminothio-S-benzoic acid, m-aminothio-S-benzoic acid, hydroxythio-S-acetic acid, p-hydroxythio-S-benzoic acid, m-hydroxythio-S-benzoic acid, cyanothio-S-acetic acid, p-cyanothio-S-benzoic acid, m-cyanothio-S-benzoic acid, nitrothio-S-acetic acid, p-nitrothio-S-benzoic acid, m-nitrothio-S-benzoic acid, acetylthio-S-acetic acid, p-acetylthio-S-benzoic acid, m-acetylthio-S-benzoic acid, thioacetylthio-S-acetic acid, p-thioacetylthio-S-benzoic acid, m-thioacetylthio-S-benzoic acid, carboxythio-S-acetic acid, p-carboxythio-S-benzoic acid, m-carboxythio-S-benzoic acid, isocyanatothio-S-acetic acid, p-isocyanatothio-S-benzoic acid, m-isocyanatothio-S-benzoic acid, chlorothio-S-acetic acid, p-chlorothio-S-benzoic acid, m-chlorothio-S-benzoic acid, bromothio-S-acetic acid, p-bromothio-S-benzoic acid and m-bromothio-S-benzoic acid. Among the above, thio-S-acetic acid, thio-S-benzoic acid, p-cyanothio-S-benzoic acid, m-cyanothio-S-benzoic acid, p-nitrothio-S-benzoic acid and m-nitrothio-S-benzoic acid are preferred in view of reactivity and ready removability after reaction.

Use of a thio-S-carboxylic acid represented by formula (1) as one of the components of polymerization initiator yields a polymer having on the end thereof a group represented by the general formula

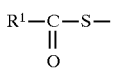

wherein $R_1$ is as defined above. That is, there is obtained a polymer having on the end thereof mercapto group protected by

.

Further treatment of this polymer with an alkali or acid yields a polymer having terminal mercapto group, from which the protecting group has been removed.

Use of, among the thio-S-carboxylic acids represented by formula (1), a compound with which the $R^1$ is a hydrocarbon group having amino, hydroxyl, carboxyl, isocyanate or like functional groups directly yields a polymer having the functional group on its end.

In the general formula (2), preferred examples of the hydrocarbon group represented by $R^2$ are those having 1 to 10 carbon atoms, among which alkyl groups and aryl groups are particularly preferred. Examples of the alkyl groups are methyl, ethyl, propyl, isopropyl, n-butyl, t-butyl, pentyl, hexyl, octyl, nonyl and decyl. Examples of the aryl groups are phenyl and naphthyl. Among the above, lower alkyl groups having 1 to 4 carbon atoms and phenyl group are preferred. These hydrocarbon groups may have a substituent. Examples of the substituent are amino, hydroxyl, carboxyl, isocyanate, cyano, nitro, acyl, thioacyl, alkoxyl and halogen atoms. Among these substituents, amino, hydroxyl, carboxyl, isocyanate and the like may be protected.

Examples of the dithio-S-carboxylic acids represented by formula (2) are dithioacetic acid, dithiopropionic acid, dithiobutyric acid, dithiobenzoic acid, aminodithioacetic acid, p-aminodithiobenzoic acid, m-aminodithiobenzoic acid, hydroxydithioacetic acid, p-hydroxydithiobenzoic acid, m-hydroxydithiobenzoic acid, cyanodithioacetic acid, p-cyanodithiobenzoic acid, m-cyanodithiobenzoic acid, nitrodithioacetic acid, p-nitrodithiobenzoic acid, m-nitrodithiobenzoic acid, acetyldithioacetic acid, p-acetyldithiobenzoic acid, m-acetyldithiobenzoic acid, thioacetyldithioacetic acid, p-thioacetyldithiobenzoic acid, m-thioacetyldithiobenzoic acid, carboxydithioacetic acid, p-carboxydithiobenzoic acid, m-carboxydithiobenzoic acid, isocyanatedithioacetic acid, p-isocyanatedithiobenzoic acid, m-isocyanatedithiobenzoic acid, chlorodithioacetic acid, p-chlorodithiobenzoic acid, m-chlorodithiobenzoic acid, bromodithioacetic acid, p-bromodithiobenzoic acid and m-bromodithiobenzoic acid. Among the above, dithioacetic acid, dithiobenzoic acid, p-cyanodithiobenzoic acid, m-cyanodithiobenzoic acid, p-nitrodithiobenzoic acid and m-nitrodithiobenzoic acid are preferred in view of reactivity and ready removability after reaction.

Use of a dithiocarboxylic acid represented by formula (2) as one of the components of polymerization initiator yields a polymer having on the end thereof a group represented by the general formula

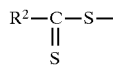

wherein $R^2$ is as defined above. That is, there is obtained a polymer having on the end thereof mercapto group protected by

Further treatment of this polymer with an alkali or acid yields a polymer having terminal mercapto group, from which the protecting group has been removed.

Use of, among the dithiocarboxylic acids represented by formula (2), a compound with which the $R^2$ is a hydrocarbon group having amino, hydroxyl, carboxyl, isocyanate or like functional groups directly yields a polymer having the functional group on its end.

In the present invention, it is necessary to use, as another component of polymerization initiator, an oxidizer (hereinafter sometimes referred to as component B of polymerization initiator) comprising at least one member selected from the group consisting of polysulfides represented by the following general formula (3), polysulfides represented by the following general formula (4) and sulfoxides

wherein $R^3$ and $R^4$ each represents a hydrocarbon group which may have a substituent including functional group and n is an integer of 2 or more, and

wherein $R^5$ and $R^6$ each represents a hydrocarbon group having a functional group and m is an integer of 2 or more.

In the general formula (3), preferred examples of the hydrocarbon group represented by $R^3$ or $R^4$ are those having 1 to 10 carbon atoms, among which alkyl groups and aryl groups are particularly preferred. Examples of the alkyl groups are methyl, ethyl, propyl, isopropyl, n-butyl, t-butyl, pentyl, hexyl, octyl, nonyl and decyl. Examples of the aryl groups are phenyl and naphthyl. Among the above, lower alkyl groups having 1 to 4 carbon atoms and phenyl group are preferred. These hydrocarbon groups may have a substituent. Examples of the substituent are amino, hydroxyl, carboxyl, isocyanate, cyano, nitro, acyl, thioacyl, alkoxyl and halogen atoms. Among these substituents, amino, hydroxyl, carboxyl, isocyanate and like functional groups may be protected.

In the general formula (3), n is an integer of 2 or more, and preferably 2 or 3, particularly 2.

Examples of the polysulfides represented by formula (3) are diacetyl disulfide, dipropionyl disulfide, dibutnoyl disulfide, dibenzoyl disulfide, 4,4'-diaminodibenzoyl disulfide, 4,4'-dihydroxydibenzoyl disulfide, 4,'4-dicarboxydibenzoyl disulfide, 4,4'-dicyanodibenzoyl disulfide, 4,4'-diisocyanatedibenzoyl disulfide, 4,4'-dinitrodibenzoyl disulfide, 4,4'-diacetyldibenzoyl disulfide, 4,4'-dithioacetyldibenzoyl disulfide, 4,4-dimethoxydibenzoyl disulfide, 4,4'-dimethyldibenzoyl disulfide, 4,4'-dichlorodibenzoyl disulfide, 4,4'-dibromodibenzoyl disulfide, dibenzoyl trisulfide and 4,4'-dithioacetyldibenzoyl trisulfide. Among the above, dibenzoyl disulfide, 4,4'-dinitrodibenzoyl disulfide, 4,4'-dithioacetyldibenzoyl disulfide and 4,4'-dicyanodibenzoyl disulfide are preferred in view of reactivity and ready removability after reaction.

Use of a polysulfide represented by formula (3) as one of the components of polymerization initiator yields a polymer having on the end thereof a group represented by the general formula

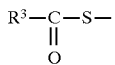

wherein $R^3$ is as defined above, or a group represented by the general formula

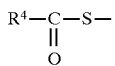

wherein $R^4$ is as defined above. That is, there is obtained a polymer having on the end thereof mercapto group protected by

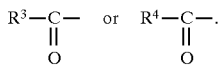

Further treatment of this polymer with an alkali or acid yields a polymer having terminal mercapto group, from which the protecting group has been removed.

Use of, among the polysulfides represented by formula (3), a compound with which the $R^3$ and $R^4$ are hydrocarbon groups having amino, hydroxyl, carboxyl, isocyanate or like functional groups directly yields a polymer having the functional group on its end.

In the general formula (4), preferred examples of the hydrocarbon groups having functional groups each represented by $R^5$ or $R^6$ are those having 1 to 10 carbon atoms, among which alkyl groups and aryl groups are particularly preferred. Examples of the alkyl groups are methyl, ethyl, propyl, isopropyl, n-butyl, t-butyl, pentyl, hexyl, octyl, nonyl and decyl. Examples of the aryl groups are phenyl and naphthyl. Among the above, lower alkyl groups having 1 to 4 carbon atoms and phenyl group are preferred. Examples of the above functional group are amino, hydroxyl, carboxyl and isocyanate. These functional groups may be protected and their representative examples are amino, hydroxyl and mercapto groups protected by acyl group such as acetyl or benzoyl; and carboxyl group protected by an alkyl or phenyl.

In the general formula (4), m is an integer of 2 or more, and preferably 2 or 3, particularly 2.

Examples of the polysulfides represented by formula (4) are 2,2'-dihydroxyethyl disulfide, 2,2'-dicarboxyethyl disulfide, 4,4'-diaminodiphenyl disulfide, 4,4'-acetamidediphenyl disulfide, 4,4'-dihydroxydiphenyl disulfide, 4,4'-diacetoxydiphenyl disulfide, 4,4'-dicarboxydiphenyl disulfide, 4,4'-dicarbomethoxydiphenyl disulfide, 4,4'-diisocyanatediphenyl disulfide and 4,4'-dithioacetyldiphenyl disulfide. Among the above, 4,4'-diaminodiphenyl disulfide, 4,4'-acetamidediphenyl disulfide, 4,4'-dihydroxydiphenyl disulfide, 4,4'-diacetoxydiphenyl disulfide, 4,4'-dicarboxydiphenyl disulfide, 4,4'-dicarbomethoxydiphenyl disulfide and 4,4'-diisocyanatediphenyl disulfide are preferred in view of reactivity and ready removability after reaction.

Use of a polysulfide represented by formula (4) as one of the components of polymerization initiator yields a polymer having on the end thereof a group represented by the general formula

$$R^5-S-$$

wherein $R^5$ is as defined above, or a group represented by the general formula

$$R^6-S-$$

wherein $R^6$ is as defined above. Use of, among the polysulfides represented by formula (4), a compound with which the $R^5$ and $R^6$ are hydrocarbon groups having amino, hydroxyl, carboxyl, isocyanate or like functional groups directly yields a polymer having the functional group on its end.

Use of a compound with which the $R^5$ and $R^6$ are hydrocarbon groups having a functional group protected by an acyl group such as acetyl or benzoyl; an alkyl group such as methyl, ethyl or propyl; phenyl group or the like yields a polymer having the protected functional group on its end. Further treatment of this polymer with an alkali or acid yields a polymer having the functional group on its end, from which the protecting group has been removed.

As the sulfoxide which may be used in the invention, those represented by the general formula (5) are preferred.

$$R^7-\underset{\underset{O}{\|}}{S}-R^8 \tag{5}$$

wherein $R^7$ and $R^5$ each represents a hydrocarbon group.

In the general formula (5), preferred examples of the hydrocarbon groups each represented by $R^7$ or $R^8$ are those having 1 to 10 carbon atoms, among which alkyl groups and aryl groups are particularly preferred. Examples of the alkyl groups are methyl, ethyl, propyl, isopropyl, n-butyl, t-butyl, pentyl, hexyl, octyl, nonyl and decyl. Examples of the aryl groups are phenyl and naphthyl. Among the above, lower alkyl groups having 1 to 4 carbon atoms and phenyl group are preferred. The above hydrocarbon groups further include divalent hydrocarbon groups formed by bonding $R^7$ and $R^8$ to each other. Examples of the divalent hydrocarbons are alkylene groups such as tetramethylene group.

Examples of the sulfoxides represented by formula (5) are dimethyl sulfoxide, diethyl sulfoxide, diisopropyl sulfoxide, di-t-butyl sulfoxide, tetramethylene sulfoxide and diphenyl sulfoxide. Among these sulfoxides, dimethyl sulfoxide, diisopropyl sulfoxide and tetramethylene sulfoxide are preferred in view of ready availability, reactivity and ready removability after reaction, and dimethyl sulfoxide is particularly preferred.

These sulfoxides, which, differing from the above thio-S-carboxylic acids, dithiocarboxylic acids and polysulfides, cannot form the polymerization initiation terminal, have nothing to do with the terminal structure of the obtained polymer.

The above polymerization initiator comprising component A and component B can be used in any amount with no specific limitation, and the amount is suitably selected according to the type of the initiator used, the type of the radical-polymerizable monomer, the polymerization conditions, the desired properties of the polymer and like factors. In general, the larger the amount of the polymerization initiator, the higher the rate of polymerization and the lower the degree of polymerization of the resulting polymer. On the other hand, the smaller the amount of the initiator, the lower the rate of polymerization and the higher the degree of polymerization of the resulting polymer. It is desirable that component B of the polymerization initiator be used in an amount of 0.00001 to 100 parts by weight based on 100 parts by weight of the radical-polymerizable monomer, more preferably 0.001 to 10 parts by weight on the same basis. With the amount of component B being less than 0.00001 part by weight, the rate of polymerization tends to become low. It is desirable that component A of the polymerization initiator be used in an amount of 0.001 mole to 10 moles based on the mole of component B, more preferably 0.01 mole to 5 moles on the same basis.

With the process of the present invention, the polymerization initiator can be added to the polymerization zone in any manner with no specific restrictions. There can be employed, for instance, ① adding component A and component B of the polymerization initiator simultaneously to a radical-polymerizable monomer, ② adding component A of the polymerization initiator to a mixture of a radical-polymerizable monomer and component B of the polymerization initiator and ③ adding component B of the polymerization initiator to a mixture of a radical-polymerizable monomer and component A of the polymerization initiator. The polymerization initiator can be added all at once or in small amounts over a period of time. To produce a polymer with high degree of polymerization, it is desirable to use the method of the above ②. To produce a polymer having functional group on one end thereof, it is desirable to use the method of the above ③. To produce a polymer having functional group on both ends thereof, it is desirable to use the method of the above ②.

Examples of radical-polymerizable monomers usable in the process of the present invention are olefins, e.g. ethylene, propylene and isobutylene; vinyl monomers, e.g. vinyl formate, vinyl acetate, vinyl propionate and vinyl pivalate; (meth)acrylic acids and their esters, e.g. acrylic acid, methacrylic acid, methyl acrylate, ethyl acrylate, butyl acrylate, 2-ethylhexyl acrylate, dodecyl acrylate, 2-hydroxyethyl acrylate, methyl methacrylate, ethyl methacrylate, butyl methacrylate, 2-ethylhexyl methacrylate, dodecyl methacrylate and 2-hydroxyethyl methacrylate; dimethylaminoethyl acrylate and dimethylaminoethyl methacrylate and quaternary salts of the foregoing, e.g. dimethylaminoethyl acrylate hydrochloric acid salt, dimethylaminoethyl methacrylate hydrochloric acid salt, dimethylaminoethyl acrylate p-toluenesulfonic acid salt and dimethylaminoethyl methacrylate p-toluenesulfonic acid salt; acrylamide-based monomers, e.g. acrylamide, methacrylamide, N-methylolacrylamide, N,N-dimethylacrylamide, 3-acroylamino-2-methylpropanesulfonic acid and sodium 3-acroylamino-2-methylpropanesulfonate; styrene monomers, e.g. styrene, α-methylstyrene, p-styrenesulfonic acid, sodium p-styrenesulfonate and potassium p-styrenesulfonate; halogen-containing monomers, e.g. vinyl chloride, vinyl fluoride, vinyl bromide, vinylidene chloride, vinylidene fluoride and vinylidene bromide; acrylonitrile; methacrylonitrile and N-vinylpyrrolidone.

The radical polymerization in the present invention can be conducted by any process such as bulk polymerization, solution polymerization, pearl polymerization or emulsion polymerization, and the process is suitably selected according to the radical-polymerizable monomer used and the intended properties of the polymer to form. In general, the polymerization temperature is, depending on the type of polymerization initiator though, desirably in a range of −10° to 110° C., more preferably in a range of −10° to 80° C.

Radical polymerization of a radical-polymerizable monomer under the above conditions gives a polymer having on one end or both ends thereof a functional group which may be protected (hereinafter sometimes referred to simply as "functional group"). Whether the functional group is introduced into one end or both ends of the resulting polymer depends on the method of adding the polymerization initiator, the type of the radical-polymerizable monomer and the polymerization conditions (in particular, the polymerization temperature and the molar ratio between component A and component B of the polymerization initiator). For instance, polymerization of a radical-polymerizable monomer with which recombination termination readily occurs, such as styrene or acrylic acid esters, using a polymerization initiator having a molar ratio between component A and component B of 1:1,000 to 1:1 readily permits the functional group to be introduced into both ends of the resulting polymer. With polymerization of a radical-polymerizable monomer readily causing dismutation termination, such as methacrylic acid esters, a polymerization temperature of at least 30° C. tends to introduce the functional group into one end of the polymer, while that of less than 30° C. into both ends of the polymer. Use of a polymerization initiator having a molar ratio between component A and component B of 1:1 to 10:1 tends to introduce the functional group into one end of the polymer.

Among the polymers produced by the above processes, those having terminal functional group that is protected give, by further treatment with an alkali or acid, polymers having terminal functional group, from which the protecting group has been removed. The treatment of a polymer having protected terminal functional group with an alkali or acid is desirably conducted in a solvent capable of dissolving or swelling the polymer, in view of reaction rate and selectivity. Examples of alkalis usable for this purpose are hydroxides of alkali metals, e.g. sodium hydroxide and potassium hydroxide and amines, e.g. ammonia, dimethylamine and diethylamine. Examples of usable acids are hydrochloric acid, sulfuric acid and acetic acid. The treating conditions with an alkali or acid is suitably selected according to the type of the polymer and protecting group, in order to cause selective removal of the protecting group alone. For instance, with a polyacrylate, use of a low concentration solution of a strong alkali such as sodium hydroxide or a solution of a weak alkali such as ammonia can remove, without decomposing the ester bonds of the polymer, the protecting group only.

Hereinbelow, the present invention is described concretely by way of Examples.

In the Examples and Comparative Examples that follow, the number average molecular weight, number average degree of polymerization, weight average degree of polymerization, amount of terminal functional group of polymer and ratio of introduction of functional group into the end of polymer were determined according to the following methods.

[Number average molecular weight, number average degree of polymerization and weight average degree of polymerization]

The number average molecular weight (hereinafter referred to as Mn), number average degree of polymerization (hereinafter referred to as Pn) and weight average degree of polymerization of a polymer (hereinafter referred to as Pw) were obtained from the standard polymethyl methacrylate analytical curve or standard polystyrene analytical curve determined by gel permeation chromatography (GPC) using a solvent of tetrahydrofuran.

[Amount of terminal functional group of polymer]

The amount of mercapto group on the end of a polymer was determined by reacting the polymer with 2,2'-dithiopyridine (2-PDS) and measuring the UV absorption spectrum of the resulting 2-thiopyridone. The amount of amino group on the end of a polymer was determined by acid titration. The amount of carboxyl group or hydroxyl group on the end of a polymer was determined by alkali titration. The amount of isocyanate group on the end of a polymer was determined in accordance with JIS K1556.

[Ratio of introduction of functional group into the end of polymer]

The ratio of introduction of functional group into the end of a polymer (hereinafter referred to as "f") was calculated with the following equation (A). With the functional group introduced 100% into one end of a polymer, f becomes 1.0; with that introduced 100% into both ends, f becomes 2.0.

$$f = S \times Mn \tag{A}$$

where f=ratio of introduction of functional group into the end of polymer,

S=equivalent of the functional group per gram of polymer, and

Mn=number average molecular weight

EXAMPLE 1

A 1000-ml four-necked reaction vessel equipped with a stirrer, thermometer, reflux condenser and nitrogen inlet port was charged with 300 g of methyl methacrylate (hereinafter referred to as MMA) purified by distillation. After the air in the vessel had been replaced by nitrogen at 70° C. for 1 hour, polymerization was started, at 90° C., by adding as polymerization initiator 2.6 g of 4,4'-diaminodiphenyl disulfide and 0.001 g of thio-S-benzoic acid. The conversion after 4 hours was 35%. After completion of the polymerization, the unreacted MMA was distilled off under vacuum, the residue was dissolved in 30 g of toluene and the solution was placed in hexane to precipitate a polymer. This purification procedure was repeated three times, to obtain a polymethyl methacrylate having terminal amino group. The amount of terminal amino group of the obtained polymer was $1.57 \times 10^{-5}$ equivalent/g and the Pn, Pw and f were 1,113, 2,670 and 1.75, respectively.

EXAMPLE 2

Polymerization was conducted in the same manner as in Example 1 except for using 7.7 g of 4,4'-dicarboxydiphenyl disulfide and 0.004 g of thio-S-benzoic acid as polymerization initiator and 500 g of MMA. The conversion after 2 hours was 66%. After completion of the polymerization, purification was carried out in the same manner as in Example 1, to obtain a polymethyl methacrylate having terminal carboxyl group. The amount of terminal carboxyl group of the obtained polymer was $2.70 \times 10^{-5}$ equivalent/g and the Pn, Pw and f were 660, 1,471 and 1.78, respectively.

EXAMPLE 3

Polymerization was conducted in the same manner as in Example 1 except for using 6.3 g of 4,4'-dihydroxy-diphenyl disulfide and 0.004 g of thio-S-benzoic acid as polymerization initiator and 500 g of MMA. The conversion after 2 hours was 70%. After completion of the polymerization, purification was carried out in the same manner as in Example 1, to obtain a polymethyl methacrylate having terminal hydroxyl group. The amount of terminal hydroxyl group of the obtained polymer was $3.00 \times 10^{-5}$ equivalent/g and the Pn, Pw and f were 572, 1,201 and 1.72, respectively.

EXAMPLE 4

Polymerization was conducted in the same manner as in Example 1 except for using 7.6 g of 4,4'-diisocyanate-diphenyl disulfide and 0.004 g of thio-S-benzoic acid as polymerization initiator and 500 g of MMA. The conversion after 2 hours was 47%. After completion of the polymerization, purification was carried out in the same manner as in Example 1, to obtain a polymethyl methacrylate having terminal isocyanate group. The amount of terminal isocyanate group of the obtained polymer was $2.30 \times 10^{-5}$ equivalent/g and the Pn, Pw and f were 672, 1,357 and 1.55, respectively.

EXAMPLE 5

A 300-ml four-necked reaction vessel equipped with a stirrer, thermometer, reflux condenser and nitrogen inlet port was charged with 100 g of n-butyl acrylate (hereinafter referred to as nBA) purified by distillation. After the air in the vessel had been replaced by nitrogen at 30° C. for 1 hour, polymerization was started by adding as polymerization initiator 2.1 g of dibenzoyl disulfide and 0.6 g of thio-S-benzoic acid. The conversion after 1 hour was 20%. After completion of the polymerization, the unreacted nBA was distilled off under vacuum, the residue was dissolved in 30 g of methanol and the solution was thrown into hexane to precipitate a polymer. This purification procedure was repeated three times, to obtain a poly(n-butyl acrylate) having terminal mercapto group protected by benzoyl group or acetyl group. The Pn and Pw of the obtained polymer were 135 and 245, respectively.

Then, 30 g of the obtained polymer was dissolved in a mixed solvent of 90 g of toluene and 30 g of methanol at 65° C., and to the obtained solution 2.66 g of a 10% sodium hydroxide solution in methanol was added, to effect reaction for 1.5 hours. Thereafter, 6 g of a 10% acetic acid solution in methanol was added to terminate the reaction. After completion of the reaction, removing the solvent and sufficiently washing with water and drying the residue gave a poly(n-butyl acrylate) having terminal mercapto group. The amount of the terminal mercapto group of the obtained polymer was $9.64 \times 10^{-5}$ equivalent/g and the f was 1.67.

EXAMPLE 6

A 500-ml four-necked reaction vessel equipped with a stirrer, thermometer, reflux condenser and nitrogen inlet port was charged with 100 g of MMA purified by distillation. After the air in the vessel had been replaced by nitrogen at 70° C. for 1 hour, polymerization was started by adding as polymerization initiator 0.2 g of dibenzoyl disulfide and 0.1 g of thio-S-acetic acid. The conversion after 1 hour was 18%. After completion of the polymerization, the unreacted MMA was distilled off under vacuum, the residue was dissolved in 30 g of methanol and the solution was thrown into hexane to precipitate a polymer. This purification procedure was repeated three times, to obtain a polymethyl methacrylate having terminal mercapto group protected by benzoyl group or acetyl group. The Pn and Pw of the obtained polymer were 870 and 1,810, respectively.

Then, 30 g of the obtained polymer was dissolved in a mixed solvent of 90 g of toluene and 30 g of methanol at 65° C., and to the obtained solution 0.137 g of a 1% sodium hydroxide solution in methanol was added, to effect reaction for 1.5 hours. Thereafter, 3 g of a 0.6% acetic acid solution in methanol was added to terminate the reaction. After completion of the reaction, removing the solvent and sufficiently washing with water and drying the residue gave a polymethyl methacrylate having terminal mercapto group. The amount of the terminal mercapto group of the obtained polymer was $1.17 \times 10^{-5}$ equivalent/g and the f was 0.98.

EXAMPLES 7 through 12

The same procedure as in Example 5 was followed except for using monomers and polymerization initiators as shown in Table 1 below, to obtain polymers having terminal mercapto group protected by benzoyl, acetyl or thioacyl group. The obtained polymers were further treated with an alkali in the same manner as in Example 5, to give polymers having terminal mercapto group. The conversion and the Pn, Pw, amount of terminal mercapto group and f of the obtained polymers are shown in Table 1 below.

TABLE 1

| Example | Temperature (°C.) | Monomer | Poly-sulfide | Thio-S-carboxylic acid or dithiocarboxylic acid | Conversion (%) | Pn | Pw | Amount of mercapto group ($10^{-4}$ equivalent/g) | f |
|---|---|---|---|---|---|---|---|---|---|
| 7 | 70 | nBA | DBDS | Thio-S-acetic acid | 50 | 62 | 101 | 2.32 | 1.84 |
| 8 | 30 | nBA | DBDS | Thio-S-benzoic acid | 21 | 122 | 207 | 0.98 | 1.53 |
| 9 | 70 | nBA | DADS | Thio-S-benzoic acid | 7 | 330 | 502 | 0.45 | 1.90 |
| 10 | 30 | nBA | DNDBS | Thio-S-acetic acid | 47 | 60 | 102 | 2.19 | 1.68 |
| 11 | 60 | MMA | DBDS | Thio-S-acetic acid | 31 | 72 | 187 | 1.43 | 1.03 |
| 12 | 70 | nBA | DBDS | Dithioacetic acid | 51 | 135 | 324 | 1.08 | 1.86 |

Abbreviations nBA: n-butyl acrylate, MMA: methyl methacrylate, DBDS: dibenzoyl disulfide, DADS: diacetyl disulfide, DNDBS: 4,4'-dinitrodibenzoyl disulfide.

EXAMPLE 13

A 500-ml four-necked reaction vessel equipped with a stirrer, thermometer, reflux condenser and nitrogen inlet port was charged with 100 g of styrene purified by distillation. After the air in the vessel had been replaced by nitrogen at 70° C. for 1 hour, 2.63 g of an polymerization initiator of dibenzoyl disulfide was added and, immediately thereafter, 5 g of a solution of 0.73 g of thio-S-acetic acid in toluene was added over 2 hours. The conversion after the 2 hours was 67%. After completion of the polymerization, the reaction mixture was thrown into methanol, to precipitate a polymer. The crude polymer was subjected to purification by reprecipitation from a mixed solvent of toluene/methanol three times, to give a polystyrene having terminal mercapto group protected by benzoyl group or acetyl group. The Pn and Pw of the obtained polymer were 107 and 192, respectively.

Then, 30 g of the obtained polymer was dissolved in a mixed solvent of 90 g of toluene and 30 g of methanol at 65° C., and to the obtained solution 2.4 g of a 10% sodium hydroxide solution in methanol was added, to effect reaction for 1.5 hours. Thereafter, 5.4 g of a 10% acetic acid solution in methanol was added to terminate the reaction. After completion of the reaction, removing the solvent and sufficiently washing with water and drying the residue gave a polystyrene having terminal mercapto group. The amount of the terminal mercapto group of the obtained polymer was $1.43 \times 10^{-4}$ equivalent/g and the f was 1.59.

EXAMPLE 14

A 500-ml four-necked reaction vessel equipped with a stirrer, thermometer, reflux condenser and nitrogen inlet port was charged with 100 g of vinyl acetate purified by distillation and 25 g of methanol. After the air in the vessel had been replaced by nitrogen at 60° C. for 1 hour, 3.1 g of an polymerization initiator of dibenzoyl disulfide was added and, immediately thereafter, 5 g of a solution of 0.86 g of thio-S-acetic acid in methanol was added over 3 hours. The conversion after the 3 hours was 27%. After completion of the polymerization, the unreacted vinyl acetate was distilled off under vacuum, to obtain a methanol solution of a polyvinyl acetate having terminal mercapto group protected by benzoyl group or acetyl group (concentration: 50%).

Then, to 30 g of the obtained methanol solution 5 ml of a 25% aqueous ammonia solution was added and the mixture was stirred at 25° C. for 10 minutes. Thereafter, the reaction mixture was thrown into water to precipitate a polymer, and the polymer was subjected to purification by reprecipitation from a mixed solvent of acetone/water twice, to give a polyvinyl acetate having terminal mercapto group. The amount of the terminal mercapto group of the obtained polymer was $1.91 \times 10^{-4}$ equivalent/g and the Pn, Pw and f were 99, 187 and 1.47, respectively.

EXAMPLE 15

A 500-ml four-necked reaction vessel equipped with a stirrer, thermometer, reflux condenser and nitrogen inlet port was charged with 300 g of 2-ethylhexyl acrylate purified by distillation. After the air in the vessel had been replaced by nitrogen at 70° C. for 1 hour, 0.225 g of an polymerization initiator of dibenzoyl disulfide was added and, immediately thereafter, 2.2 g of a solution of 0.0143 g of thio-S-acetic acid in toluene was added over 30 minutes. The conversion after the 30 minutes was 31%. After completion of the polymerization, the reaction mixture was thrown into methanol, to precipitate a polymer. The crude polymer was subjected to purification by reprecipitation from a mixed solvent of toluene/methanol three times, to give a poly(2-ethylhexyl acrylate) having terminal mercapto group protected by benzoyl group or acetyl group. The Pn and Pw of the obtained polymer were 1,211 and 2,560, respectively.

Then, 30 g of the obtained polymer was dissolved in a mixed solvent of 90 g of toluene and 30 g of methanol at 70° C., and to the obtained solution 0.1 g of a 1% sodium hydroxide solution in methanol was added, to effect reaction for 2 hours. Thereafter, 0.24 g of a 1% acetic acid solution in methanol was added to terminate the reaction. After completion of the reaction, removing the solvent and sufficiently washing with water and drying the residue gave a poly(2-ethylhexyl acrylate) having terminal mercapto group. The amount of the mercapto group of the obtained polymer was $8.40 \times 10^{-6}$ equivalent/g and the f was 1.01.

EXAMPLE 16

A 500-ml four-necked reaction vessel equipped with a stirrer, thermometer, reflux condenser and nitrogen inlet port was charged with 100 g of nBA purified by distillation. After the air in the vessel had been replaced by nitrogen at 70° C. for 1 hour, 1.22 g of an polymerization initiator of dimethyl sulfoxide was added and the mixture was cooled to 5° C. To the mixture 1.12 g of thio-S-acetic acid was added. The conversion after 1 hour was 20%. After completion of the polymerization, the unreacted nBA was distilled off under vacuum and the residue was dissolved in 30 g of methanol. The obtained solution was thrown into hexane, to precipitate a polymer. This purification procedure was repeated three times, to obtain a poly(n-butyl acrylate) having terminal mercapto group protected by acetyl group. The Pn and Pw of the obtained polymer were 78 and 171, respectively.

Then, 30 g of the obtained polymer was dissolved in a mixed solvent of 90 g of toluene and 30 g of methanol at 65° C., and to the obtained solution 1.2 parts of a 1% sodium hydroxide solution in methanol was added, to effect reaction for 1.5 hours. Thereafter, 6 g of a 1% acetic acid solution in methanol was added to terminate the reaction. After completion of the reaction, removing the solvent and sufficiently washing with water and drying the residue gave a poly(n-butyl acrylate) having terminal mercapto group. The amount of the mercapto group of the obtained polymer was $1.80 \times 10^{-4}$ equivalent/g and the f was 1.81.

EXAMPLES 17 through 20

The same procedure as in Example 16 was followed except for changing the amount of polymerization initiators as shown in Table 2 below, to obtain polymers having terminal mercapto group protected by acetyl group. The obtained polymers were further treated with an alkali in the same manner as in Example 16, to give poly(n-butyl acrylate)s having terminal mercapto group. The rate of polymerization and the Pn, Pw and f of the obtained polymers are shown in Table 2 below.

TABLE 2

| Example | DMSO (g) | Thio-S-acetic acid (g) | Rate of polymerization (%/h) | Pn | Pw | f |
|---------|----------|------------------------|------------------------------|-----|------|------|
| 17 | 0.122 | 0.112 | 7 | 640 | 1122 | 1.69 |
| 18 | 12.0 | 0.6 | 20 | 470 | 780 | 1.72 |
| 19 | 0.2 | 1.5 | 6 | 111 | 233 | 1.10 |
| 20 | 1.2 | 5.0 | 18 | 88 | 202 | 1.10 |

Abbreviation DMSO: dimethyl sulfoxide

EXAMPLES 21 through 26

The same procedure as in Example 16 was followed except for using monomers and polymerization initiator as shown in Table 3 below, to obtain polymers having terminal mercapto group protected by benzoyl, acetyl or thioacyl group. The obtained polymers were further treated with an alkali in the same manner as in Example 16, to give polymers having terminal mercapto group. The rate of polymerization and the Pn, Pw and f of the obtained polymers are shown in Table 3 below.

three times, to give a polystyrene having terminal mercapto group protected by acetyl group. The Pn and Pw of the obtained polymer were 115 and 196, respectively.

Then, 30 g of the obtained polymer was dissolved in a mixed solvent of 90 g of toluene and 30 g of methanol at 65° C., and to the obtained solution 2.4 g of a 10% sodium hydroxide solution in methanol was added, to effect reaction

TABLE 3

| Example | Monomer | Sulfoxide | Thio-S-carboxylic acid or dithiocarboxylic acid | Rate of polymerization (%/h) | Pn | Pw | f |
|---|---|---|---|---|---|---|---|
| 21 | nBA | DMSO | Thio-S-benzoic acid | 30 | 60 | 102 | 1.82 |
| 22 | nBA | TMSO | Thio-S-acetic acid | 27 | 65 | 120 | 1.66 |
| 23 | nBA | DPSO | Thio-S-acetic acid | 16 | 101 | 222 | 1.18 |
| 24 | tBA | DMSO | Thio-S-acetic acid | 28 | 95 | 171 | 1.37 |
| 25 | MMA | DMSO | Thio-S-acetic acid | 21 | 72 | 187 | 1.41 |
| 26 | MMA | DMSO | Dithioacetic acid | 46 | 88 | 193 | 1.46 |

Abbreviations nBA: n-butyl acrylate, tBA: t-butyl acrylate, MMA: methyl methacrylate, DMSO: dimethyl sulfoxide, TMSO: tetramethylene sulfoxide, DPSO: diphenyl sulfoxide.

EXAMPLE 27

A 500-ml four-necked reaction vessel equipped with a stirrer, thermometer, reflux condenser and nitrogen inlet port was charged with 100 g of 2-ethylhexyl acrylate purified by distillation. After the air in the vessel had been replaced by nitrogen at 70° C. for 1 hour, 8.5 g of a polymerization initiator of dimethyl sulfoxide was added and, immediately thereafter, 3 g of a solution of 0.10 g of thio-S-acetic acid in toluene was added over 30 minutes. The conversion after the 30 minutes was 38%. After completion of the polymerization, the reaction mixture was thrown into methanol, to precipitate a polymer. The crude polymer was subjected to purification by reprecipitation from a mixed solvent of toluene/methanol three times, to give a poly(2-ethylhexyl acrylate) having terminal mercapto group protected by acetyl group. The Pn and Pw of the obtained polymer were 691 and 2,266, respectively.

Then, 30 g of the obtained polymer was dissolved in a mixed solvent of 90 g of toluene and 30 g of methanol at 70° C., and to the obtained solution 0.1 g of a 1% sodium hydroxide solution in methanol was added, to effect reaction for 2.0 hours. Thereafter, 0.24 g of a 1% acetic acid solution in methanol was added to terminate the reaction. After completion of the reaction, removing the solvent and sufficiently washing with water and drying the residue gave a poly(2-ethylhexyl acrylate) having terminal mercapto group. The amount of the terminal mercapto group of the obtained polymer was $1.41 \times 10^{-5}$ equivalent/g and the f was 1.80.

EXAMPLE 28

A 300-ml four-necked reaction vessel equipped with a stirrer, thermometer, reflux condenser and nitrogen inlet port was charged with 100 g of styrene purified by distillation. After the air in the vessel had been replaced by nitrogen at 70° C. for 1 hour, 0.73 g of a polymerization initiator of dimethyl sulfoxide was added and, immediately thereafter, 5 g of a solution of 0.90 g of thio-S-acetic acid in toluene was added uniformly over 2 hours. The conversion after the 2 hours was 38%. After completion of the polymerization, the reaction mixture was thrown into methanol, to precipitate a polymer. The crude polymer was subjected to purification by reprecipitation from a mixed solvent of toluene/methanol for 1.5 hours. Thereafter, 5.4 parts of a 10% acetic acid solution in methanol was added to terminate the reaction. After completion of the reaction, removing the solvent and sufficiently washing with water and drying the residue gave a polystyrene having terminal mercapto group. The amount of the terminal mercapto group of the obtained polymer was $1.29 \times 10^{-4}$ equivalent/g and the f was 1.54.

EXAMPLE 29

A 300-ml four-necked reaction vessel equipped with a stirrer, thermometer, reflux condenser and nitrogen inlet port was charged with 100 g of vinyl acetate purified by distillation and 25 g of methanol. After the air in the vessel had been replaced by nitrogen at 60° C. for 1 hour, 0.90 g of a polymerization initiator of dimethyl sulfoxide was added and, immediately thereafter, 5 g of a solution of 1.4 g of thio-S-acetic acid in toluene was added over 3 hours. The conversion after the 3 hours was 51%. After completion of the polymerization, the unreacted vinyl acetate was distilled off under vacuum, to obtain a methanol solution of a polyvinyl acetate having terminal mercapto group protected by acetyl group (concentration: 61%).

To 31 g of the obtained methanol solution 5 ml of a 25% aqueous ammonia solution was added, and the mixture was stirred at 25° C. for 10 minutes. Then, the mixture was thrown into water to precipitate a polymer. The crude polymer was subjected to purification by reprecipitation from a mixed solvent of acetone/water twice, to give a polyvinyl acetate having terminal mercapto group. The amount of the terminal mercapto group of the obtained polymer was $1.37 \times 10^{-4}$ equivalent/g and the Pn, Pw and f were 116, 209 and 1.36, respectively.

Comparative Example 1

A 500-ml four-necked reaction vessel equipped with a stirrer, thermometer, reflux condenser and nitrogen inlet port was charged with 100 g of MMA purified by distillation. After the air in the vessel had been replaced by nitrogen at 70° C. for 1 hour, polymerization was started by adding 0.1 g of thio-S-acetic acid and 0.01 g of AIBN. The conversion after 1 hour was 1.1%. After completion of the polymerization, the unreacted MMA was distilled off under vacuum and the residue was dissolved in 30 g of methanol.

The solution was thrown into hexane, to precipitate a polymer. This purification procedure was repeated three times, to obtain a polymethyl methacrylate having terminal mercapto group protected by acetyl group. The Pn and Pw of the obtained polymer were 780 and 1,653, respectively.

Then, 30 g of the obtained polymer was dissolved in a mixed solvent of 90 g of toluene and 30 g of methanol at 65° C., and to the obtained solution 0.15 g of a 1% sodium hydroxide solution in methanol was added, to effect reaction for 1.5 hours. Thereafter, 3.1 g of a 0.6% acetic acid solution in methanol was added to terminate the reaction. After completion of the reaction, removing the solvent and sufficiently washing with water and drying the residue gave a polymethyl methacrylate having terminal mercapto group. The amount of the terminal mercapto group of the obtained polymer was $5.80 \times 10^{-6}$ equivalent/g and the f was 0.45.

Comparative Example 2

A 1,000-ml four-necked reaction vessel equipped with a stirrer, thermometer, reflux condenser and nitrogen inlet port was charged with 300 g of MMA purified by distillation. After the air in the vessel had been replaced by nitrogen at 70° C. for 1 hour, polymerization was started by adding 0.114 g of thio-S-acetic acid and 5 mg of AIBN. The conversion after 6 hours was 35%. After completion of the polymerization, the unreacted MMA was distilled off under vacuum and the residue was dissolved in 30 g of methanol. The solution was thrown into hexane, to precipitate a polymer. This purification procedure was repeated three times, to obtain a polymethyl methacrylate having terminal mercapto group protected by acetyl group. The Pn and Pw of the obtained polymer were 1,380 and 3,174, respectively.

Then, 30 g of the obtained polymer was dissolved in a mixed solvent of 90 g of toluene and 30 g of methanol at 65° C., and to the obtained solution 0.1 g of a 1% sodium hydroxide solution in methanol was added, to effect reaction for 1.5 hours. Thereafter, 3 g of a 1% acetic acid solution in methanol was added to terminate the reaction. After completion of the reaction, removing the solvent and sufficiently washing with water and drying the residue gave a polymethyl methacrylate having terminal mercapto group. The amount of the terminal mercapto group of the obtained polymer was $2.24 \times 10^{-6}$ equivalent/g and the f was 0.31.

Comparative Example 3

A 500-ml four-necked reaction vessel equipped with a stirrer, thermometer, reflux condenser and nitrogen inlet port was charged with 300 g of MMA purified by distillation. After the air in the vessel had been replaced by nitrogen at 70° C. for 1 hour, polymerization was started at 90° C. by adding 2.6 g of 4,4'-diaminodiphenyl disulfide and 5 mg of AIBN. The conversion after 3 hours was 55%. After completion of the polymerization, the unreacted MMA was distilled off under vacuum and the residue was dissolved in 100 g of methanol. The solution was thrown into hexane, to precipitate a polymer. This purification procedure was repeated three times, to obtain a polymethyl methacrylate having terminal amino group. The amount of the terminal amino group of the obtained polymer was $9.20 \times 10^{\times 6}$ equivalent/g and the Pn, Pw and f were 1,250, 3,700 and 1.15, respectively.

Industrial Applicability

According to the present invention, there can be produced polymers with which functional groups have been introduced into one end or both ends thereof, irrespective of the rate of polymerization or the degree of polymerization of the polymer that forms. Furthermore, the process of the present invention is applicable to any monomer capable of undergoing radical polymerization and, having only a few reaction steps, is a commercially advantageous process.

The polymers produced by the process of the present invention, having terminal mercapto, amino, hydroxyl, carboxyl, isocyanate or like functional groups are very useful as starting material for block copolymers and graft copolymers which are usable as, for example, compatibility improving agents for alloys and additives for polymer blends. These polymers, being readily reactive with polyester, polyurethane or like resins, are also very useful as additives to improve their properties or provide them with new functions.

We claim:

1. A process for producing a polymer having a terminal functional group which is optionally protected, comprising:

polymerizing a radial-polymerizable monomer in the presence of a polymerization initiator consisting essentially of at least one member selected from the group (A) consisting of thio-S-carboxylic acids represented by the following formula (1) and dithiocarboxylic acids represented by the following formula (2) and at least one member selected from the group (B) consisting of polysulfides represented by the following formula (3), polysulfides represented by the following formula (4) and sulfoxides:

wherein $R^1$ represents a hydrocarbon group optionally substituted by a functional group:

wherein $R^2$ represents a hydrocarbon group which optionally is substituted by a functional group:

wherein $R^3$ and $R^4$ each represent a hydrocarbon group optionally substituted by a functional group and n is an integer of 2 or more; and

wherein $R^5$ and $R^6$ each represents a hydrocarbon group having a functional group and m is an integer of 2 or more.

2. The process of claim 1, wherein said sulfoxides have the formula (5):

wherein $R^7$ and $R^8$ each represents a hydrocarbon group.

3. The process of claim 2, wherein the polymer obtained by said polymerization step is treated with an alkali or acid.

4. The process of claim 1, which further comprises treating the polymer obtained by said polymerizing step with an alkali or acid.

5. The process of claim 1, wherein said group (A) comprises a thio-S-carboxylic acid represented by the following general formula (1):

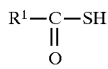

wherein $R^1$ is a hydrocarbon group or a hydrocarbon group with a functional group attached thereto; and wherein the member of group (B) is a sulfoxide.

6. The process of claim 1, wherein the amount of component (B) of the polymerization initiator in the reaction ranges from 0.00001 to 100 parts by weight based on 100 parts by weight of the radical-polymerizable monomer.

7. The process of claim 6, wherein said amount of components (B) ranges from 0.001 to 10 parts by weight of said radical-polymerizable monomer.

8. The process of claim 1, wherein the amount of said component (A) of the polymerization initiator ranges from 0.001 mol to 10 mols per mol of component (B).

9. The process of claim 8, wherein said amount of component (A) ranges from 0.01 mol to 5 mols.

10. The process of claim 1, wherein the radical polymerization is a bulk polymerization, solution polymerization, pearl polymerization or emulsion polymerization occurring at a temperature within the range of −10° to 110° C.

11. The process of claim 1, wherein the molar ratio of component A to component B ranges from 1:1000 to 1:1 in a recombination termination reaction.

12. The process of claim 1, wherein the molar ratio or component A to component B ranges from 1:1 to 10:1, thereby introducing a functional group into one end of the polymer produced.

13. The process of claim 1, wherein said sulfoxide is dimethyl sulfoxide, diethyl sulfoxide, diisopropyl sulfoxide, di-t-butyl sulfoxide, tetramethylene sulfoxide or diphenyl sulfoxide.

14. The process of claim 1, wherein $R^1$ is a $C_{1-10}$ alkyl group, phenyl or naphthyl.

15. The process of claim 14, wherein the functional group substituted on group $R^1$ is amino, hydroxyl, carboxyl, isocyanato, cyano, nitro, acyl, thioacyl, alkoxy or halogen.

* * * * *